United States Patent

Nelson et al.

[15] 3,636,332

[45] Jan. 18, 1972

[54] DIVIDER-MULTIPLIER CIRCUIT

[72] Inventors: Robert E. Nelson, Indianapolis; Robert K. Sanders, Whitestown; Oran Alton Watts, III, Indianapolis, all of Ind.

[73] Assignee: General Motors Corporation, Detroit, Mich.

[22] Filed: July 22, 1970

[21] Appl. No.: 57,202

[52] U.S. Cl. ....................235/195, 235/183, 235/194, 307/229, 328/160

[51] Int. Cl. ....................G06g 7/16, G06g 7/18

[58] Field of Search ....................235/194, 196, 195, 183; 307/229, 230; 328/160, 161

[56] References Cited

UNITED STATES PATENTS

| | | | |
|---|---|---|---|
| 2,966,306 | 12/1960 | Isabeau | 235/194 |
| 3,043,516 | 7/1962 | Abbott et al. | 235/195 |
| 3,383,501 | 5/1968 | Patchell | 235/195 |
| 3,492,471 | 1/1970 | Crowell | 235/194 |

*Primary Examiner*—Joseph F. Ruggiero
*Attorney*—Eugene W. Christen, Creighton R. Meland and Richard G. Stahr

[57] ABSTRACT

A divider-multiplier circuit for dividing a first direct current potential signal by a second direct current potential signal and multiplying the quotient by a third direct current potential signal. During respective alternate half cycles of a series of square waveform alternating current reference signals, a dividend signal is applied through a potential sensitive switch to one input circuit of an integrating operational amplifier, which integrates this signal in a first direction, and a divisor signal is applied through another potential sensitive switch to the input circuit of the integrating operational amplifier which results in an integration thereby of the divisor signal in a second opposite direction. While the second direct current potential signal is being integrated, the third direct current potential signal is applied through a third potential sensitive switch to a direct current potential signal averaging circuit until the second direct current potential signal has been integrated to substantially zero, at which time a switching arrangement sensitive to a substantially zero output signal from the integrating operational amplifier extinguishes the third potential sensitive switch.

6 Claims, 3 Drawing Figures

INVENTORS
Robert E. Nelson,
Robert K. Sanders &
BY Oran Alton Watts III
Richard G. Stahr
ATTORNEY INVENTORS
Robert E. Nelson,
Robert K. Sanders &
BY Oran Alton Watts III Richard G. Stahr
ATTORNEY

DIVIDER-MULTIPLIER CIRCUIT

The invention herein described was made in the course of work under contract or subcontract thereunder with the Department of Defense.

This invention is directed to a divider-multiplier circuit and, more specifically, to a divider-multiplier circuit for dividing a first direct current potential signal by a second direct current potential signal and multiplying the quotient by a third direct current potential signal.

With many applications, it is desirable to obtain a product in the form of an analog direct current potential signal which results from the multiplication of the quotient of two direct current potential signals by a third direct current potential signal.

It is, therefore, an object of this invention to provide an improved divider-multiplier circuit.

It is another object of this invention to provide an improved divider-multiplier circuit for dividing a first direct current potential signal by a second direct current potential signal and multiplying the quotient by a third direct current potential signal.

In accordance with this invention, a divider-multiplier circuit for dividing a first direct current potential signal by a second direct current potential signal and multiplying the quotient by a third direct current potential signal is provided wherein a first direct current potential signal is integrated in a first direction by an integrating operational amplifier during each selected half cycle of a series of square waveform alternating current reference signals and a second direct current potential signal is integrated in a second direction by the integrating operational amplifier and the third direct current potential signal is applied to the input circuit of a direct current potential signal averaging circuit during alternate half cycles of the reference signals until the integrating operational amplifier output signal reaches substantially zero at which time a circuit arrangement sensitive to a substantially zero integrating operating amplifying output signal operates to disconnect the third direct current potential signal from the averaging circuit.

Figure 1:
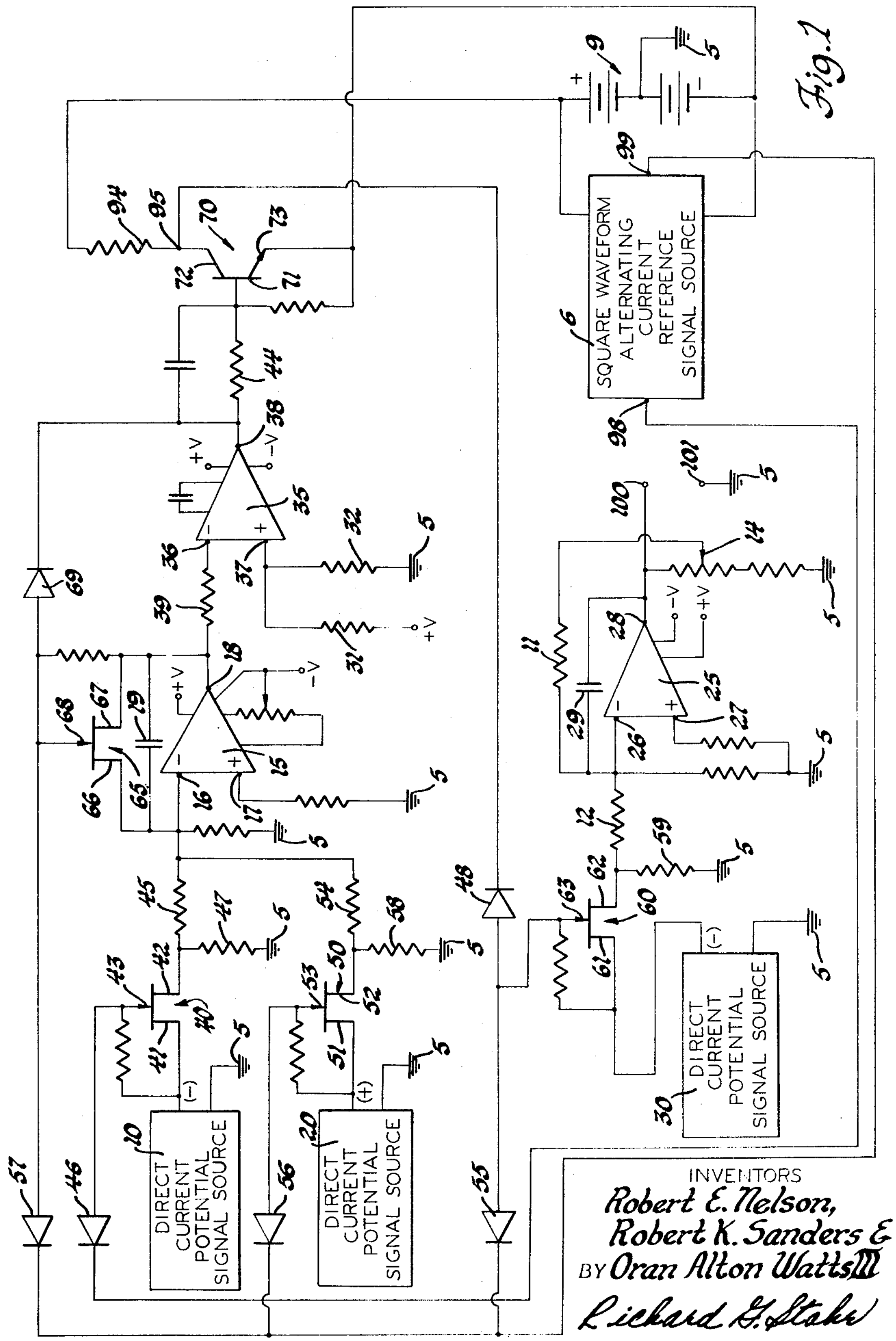
Figure 2:
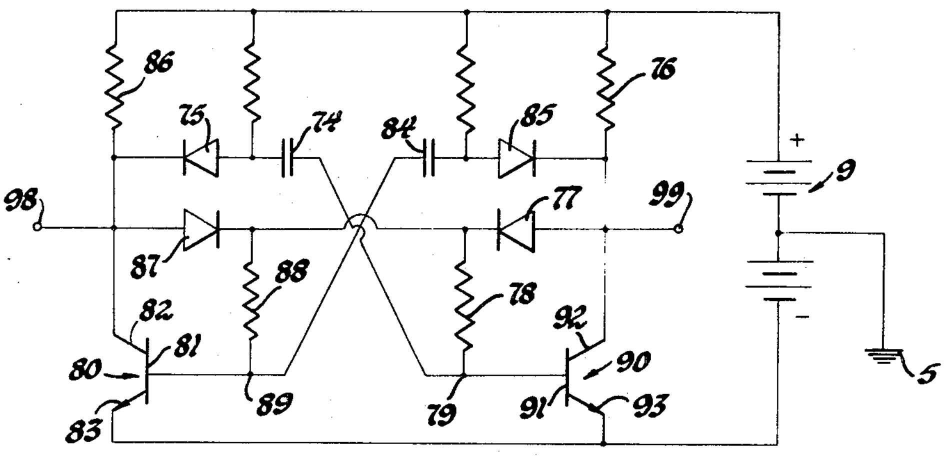
Figure 3:
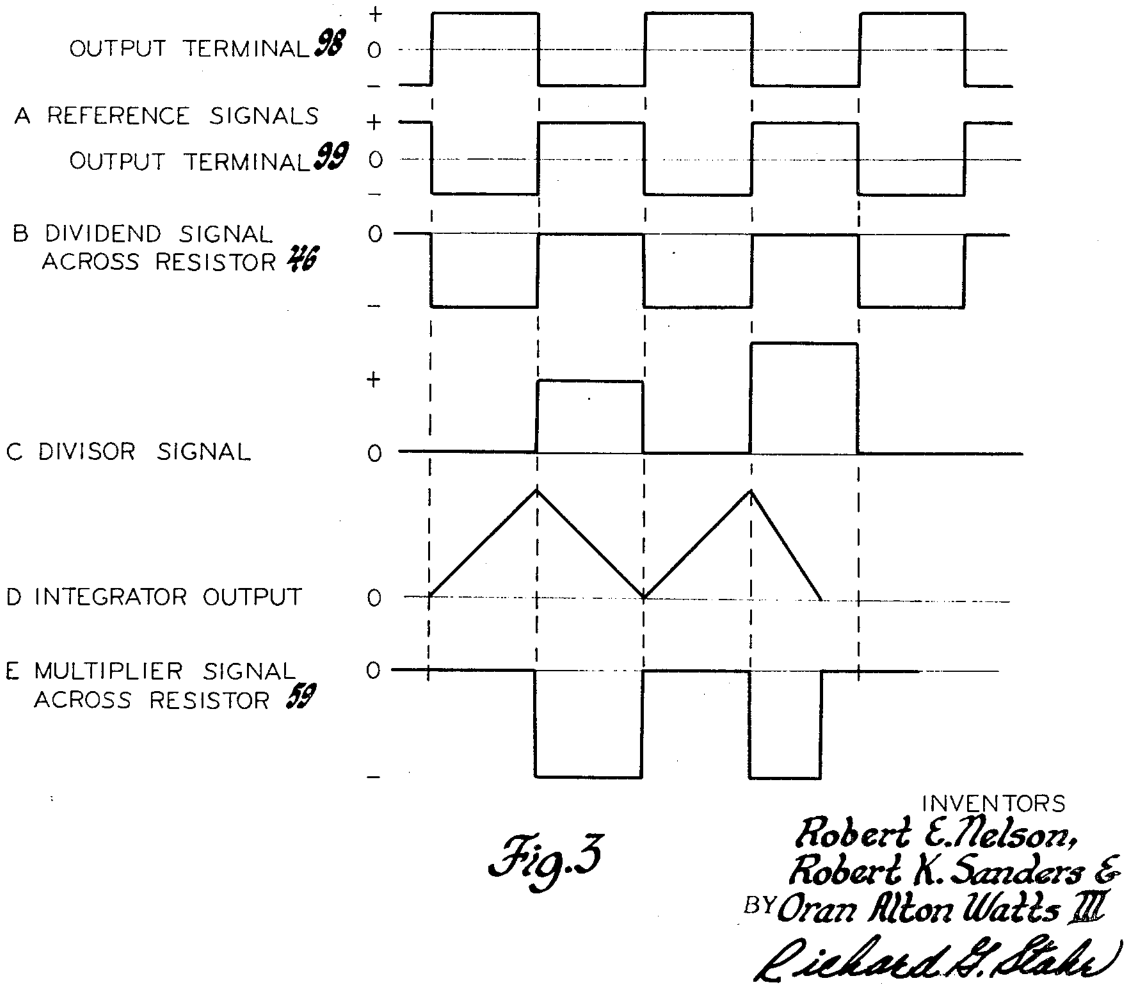

For a better understanding of the present invention, together with additional objects, advantages, and features thereof, reference is made to the following description and accompanying drawings in which:

FIG. 1 sets forth the divider-multiplier circuit of this invention in schematic form;

FIG. 2 is a schematic circuit of a square waveform alternating current reference signal source suitable for use with the divider-multiplier circuit of this invention; and FIG. 3 is a set of curves useful in understanding the operation of the divider-multiplier circuit of this invention.

In FIGS. 1 and 2 of the drawing, the point of reference or ground potential has been represented by the accepted schematic symbol and referenced by the numeral 5.

To reduce the complexity of FIG. 1, all circuit connections to the direct current operating potential source 9 have not been shown. However, all points of this circuit which are connected to the positive polarity output terminal of direct current operating potential source 9 are labeled +V and all points of this circuit which are connected to the negative polarity output terminal of direct current operating potential source 9 are labeled −V.

Referring to FIG. 1 of the drawings, the divider-multiplier circuit of this invention is set forth in schematic form in combination with first, second and third direct current potential signal sources, referenced by respective numerals 10, 20 and 30, a square waveform alternating current reference signal source 6 and a direct current operating potential source, which may be a battery 9, and comprises an operational amplifier 15 having an inverting input circuit 16, a noninverting input circuit 17, an output circuit 18 and feedback circuitry, capacitor 19, which renders this device capable of integrating direct current input signals in a positive and a negative direction; an averaging circuit, which may be another operational amplifier 25 and the associated circuitry, having an input circuit 26 and an output circuit 28 upon which the divider-multiplier output signal appears of the type which will provide a direct current potential output signal of a magnitude which is the average of the magnitudes of a series of direct current potential input signal pulses; a first switch, which may be a field effect transistor 40, responsive to each selected half cycle of the reference signals for applying the first direct current potential signal to a selected one input circuit of operational amplifier 15 whereby the first direct current potential signal is integrated thereby in a first polarity direction; second and third switches, which may be respective field effect transistors 50 and 60, responsive to each alternate half cycle of the reference signals for applying the second direct current potential signal to the one input circuit of operational amplifier 15 which results in the integration thereby of the second direct current potential signal in a second opposite polarity direction and for applying the third direct current potential signal to the input circuit of the averaging circuit, respectively; and circuitry, which may be operational amplifier 35 and transistor 70 and the associated circuitry, responsive to an output signal of substantially zero from operational amplifier 15 for rendering the third switch not conductive.

The first, second and third direct current potential signal sources 10, 20 and 30 may be any direct current potential signal source which provides a direct current potential output signal which is a function of some physical or electrical quantity such as pressure, temperature, mechanical force, light, weight, acceleration, velocity, voltage, current, etc. For example, and without intention of being exhaustive, these sources may be thermocouples, pressure transducers, piezoelectric crystals, generators or oscillators. Consequently, direct current potential signal sources 10, 20 and 30 have been indicated in FIG. 1 in block form.

The direct current operating potential source is indicated in FIG. 1 to be a battery 9 having positive and negative polarity output terminals with respect to point of reference or ground potential 5. It is to be specifically understood, however, that any conventional direct current potential source having equal magnitude output potentials of a positive and a negative polarity with respect to point of reference or ground potential may be employed without departing from the spirit of the invention.

One example, and without intention or inference of a limitation thereto, of a square waveform alternating current reference signal source suitable for use with the divider-multiplier circuit of this invention is schematically set forth in FIG. 2. This reference signal source may be a conventional astable or free-running multivibrator circuit including two type NPN-transistors 80 and 90, each having respective base electrodes 81 and 91, respective collector electrodes 82 and 92 and respective emitter electrodes 83 and 93 and the associated circuitry. Upon the application of the operating potential to this circuit, a forward base-emitter potential is applied across the base-emitter electrodes of both transistors 80 and 90 in the proper polarity relationship to produce base-emitter current flow through type NPN-transistors. As the circuit parameters are not precisely equal, one or the other of transistors 80 or 90 will initially conduct through the collector-emitter electrodes thereof. For purposes of this specification, it will be assumed that transistor 80 initially conducts through the collector-emitter electrodes. Upon the conduction of transistor 80, the base electrode 91 of transistor 90 is connected to the negative polarity output terminal of battery 9 through capacitor 84 and diode 85, a condition which maintains transistor 90 not conductive, and capacitor 84 charges through a circuit which may be traced from the positive polarity output terminal of battery 9 through collector resistor 76, diode 77, resistor 78, capacitor 74, diode 75 and the collector-emitter electrodes of conducting transistor 80 to the negative polarity terminal of battery 9. When capacitor 74 has become charged, the potential upon junction 79 goes positive of a sufficient magnitude to produce base-emitter current flow through type NPN-transistor 90 to initiate collector-emitter current flow therethrough. Upon the conduction of transistor 90, the base electrode 81 of transistor 80 is connected to the negative polarity output terminal of battery 9 through capacitor 84 and diode 85, a condition which extinguishes transistor 80 and capacitor 84 charges through a circuit which may be traced from the positive polarity output terminal of battery 9, through collector resistor 86, diode 87, resistor 88, capacitor 84, diode 85 and the collector-emitter electrodes of conducting transistor 90 to the negative polarity terminal of battery 9. When capacitor 84 has become charged, the potential upon junction 89 goes positive of a sufficient magnitude to produce base-emitter current flow through type NPN-transistor 80 to initiate collector-emitter current flow therethrough. Upon the conduction of transistor 80, the base electrode 91 of transistor 90 is again connected to the negative polarity output terminal of battery 9 through the circuit previously described, consequently, transistor 90 extinguishes and capacitor 74 again begins to charge through the circuit previously described. This action continues with transistors 80 and 90 alternately conducting at a frequency determined by the values of resistors 76 and 78 and capacitor 74 and resistors 86 and 88 and capacitor 84. The output signals may be taken from the collector of respective transistors 80 and 90 through respective output terminals 98 and 99. While transistor 90 is conducting, a positive polarity output signal, with respect to point of reference or ground potential 5 is present upon output circuit terminal 98 and a negative polarity output signal, with respect to point of reference or ground potential 5, is present upon output circuit terminal 99. While transistor 80 is conducting, a negative polarity output signal, with respect to point of reference or ground potential 5, is present upon output circuit terminal 98 and a positive polarity output signal, with respect to point of reference or ground potential 5, is present upon output circuit terminal 99. These signals are graphically illustrated in FIG. 3A. Consequently, this circuit provides a square waveform alternating current reference signal source having two complementary polarity output circuits. In a practical application of the circuit of this invention, the square waveform alternating current reference signal source 6 had a frequency of 2 kilocycles.

Operational amplifiers are high gain, direct current amplifiers, which are well known in the art and are commercially available, having an inverting input circuit, a noninverting input circuit and an output circuit. An input signal applied to the inverting input circuit of an operational amplifier produces an output signal of the opposite polarity and an input signal applied to the noninverting input circuit produces an output signal of the same polarity. Operational amplifiers may be converted to direct current signal integrating circuits by providing a feedback capacitor between the output circuit and the inverting input circuit.

In FIG. 1, operational amplifier 15 is illustrated as having an inverting input circuit terminal 16, a noninverting input circuit terminal 17 and an output circuit terminal 18. Feedback capacitor 19, connected across output circuit terminal 18 and inverting input circuit terminal 16, converts operational amplifier 15 into an integrating circuit which is capable of integrating direct current input signals in a positive and a negative direction, depending upon the polarity of the input signal and the input circuit terminal to which it is applied, in a manner well known in the art.

The averaging circuit having an input circuit and an output circuit upon which the divider-multiplier output signal appears of the type which will provide a direct current potential output signal of a magnitude which is the average of the magnitudes of a series of direct current potential input signal pulses may be any suitable direct current averaging circuit possessing these characteristics. Without intention or inference of a limitation thereto, the averaging circuit may be an operational amplifier 25, illustrated in FIG. 1 as having an inverting input circuit terminal 26, a noninverting input circuit terminal 27 and an output circuit terminal 28, and the associated circuitry. As capacitor 29 is connected across the output circuit terminal 28 and the inverting input circuit terminal 26 of operational amplifier 25, this device is essentially a direct current potential signal integrator. Resistor 11, connected across output circuit terminal 28 and inverting input circuit terminal 26, and input resistor 12 determine the gain of operational amplifier 25. A potentiometer 14 may be included to function as a gain trimmer.

The switch responsive to each selected half cycle of the reference signals for applying the first direct current potential signal to a selected one input circuit of operational amplifier 15 whereby the first direct current potential signal is integrated thereby in a first polarity direction may be a field effect transistor 40 of the N-channel type having a source electrode 41, a drain electrode 42 and a gate electrode 43.

The switch responsive to each alternate half cycle of the reference signals for applying the second direct current potential signal to the one input circuit of operational amplifier 15 which results in the integration thereby of the second direct current potential signal in a second opposite polarity direction may be a field effect transistor 50 of the N-channel type having a source electrode 51, a drain electrode 52 and a gate electrode 53.

The switch responsive to each alternate half cycle of the reference signals for applying the third direct current potential signal to the input circuit of the averaging circuit may be a field effect transistor 60 of the N-channel type having a source electrode 61, a drain electrode 62, and a gate electrode 63.

Field effect transistors of the N-channel type are normally conductive in either direction through the source-drain electrodes unless held not conductive by the application of a negative polarity potential signal to the gate electrode with respect to the potential upon the source electrode. In the circuit of this invention, field effect transistors 40, 50 and 60 function as potential sensitive switches which are responsive to the reference signals to apply the direct current signals supplied by direct current potential signal sources 10, 20 and 30 to the divider-multiplier circuit of this invention in the proper sequence in a manner to be explained in detail later in this specification. It is to be specifically understood, however, that alternative switching devices which are sensitive to direct current potentials for establishing and interrupting an electrical circuit may be substituted for any or all of field effect transistors 40, 50 or 60 without departing from the spirit of the invention.

The circuitry responsive to an output signal of substantially zero from integrating operational amplifier 15 for rendering field effect transistor 60 not conductive may be an operational amplifier 35 having an inverting input circuit terminal 36, a noninverting input circuit terminal 37 and an output circuit terminal 38, type NPN-transistor 70 having a base electrode 71, a collector electrode 72 and an emitter electrode 73 and the associated circuitry. The output signal from integrating operational amplifier 15 is applied to the inverting input circuit terminal 36 of operational amplifier 35 through input resistor 39.

As there is no negative feedback circuit between output circuit terminal 38 and inverting input circuit terminal 36 of operational amplifier 35, this device operates in the open loop mode. When operating in the open loop mode, the output of an operational amplifier is zero with a zero input signal upon the inverting input circuit terminal. With any change of the input signal upon the inverting input circuit terminal from zero, an operational amplifier operating in the open loop mode immediately saturates to produce an opposite polarity output signal. That is, operated in an open loop mode, an operational amplifier functions essentially as an extremely sensitive high-speed switch.

It has been found that the most satisfactory operation of the divider-multiplier circuit of this invention is obtained with operational amplifier 35 switching to the alternate state with an output potential signal from integrating operational amplifier 15 of a slightly positive polarity magnitude. In a practical application of the circuit of this invention, operational amplifier 35 was designed to switch to the alternate state at a magnitude of 0.01 volt positive upon the inverting input circuit. Consequently, resistors 31 and 32 connected in series across the positive polarity terminal of battery 9 and point of reference or ground potential 5 are proportioned to provide for the switching of operational amplifier 35 to the opposite state with a slightly positive polarity output signal from integrating operational amplifier 15.

Consequently, with an output signal from integrating operational amplifier 15 of any positive polarity greater than that at which operational amplifier 35 is designed to switch to the alternate state, the output signal of operational amplifier 35 is of a negative polarity and substantially equal in magnitude to the magnitude of the direct current operating potential source 9 between the negative polarity output terminal thereof and the point of reference or ground potential 5 and with an output signal potential from integrating amplifier 15 of any positive polarity less than that at which operating amplifier 35 is designed to switch to the alternate state or of a negative polarity, the output signal of operating amplifier 35 is of a positive polarity and of a magnitude substantially equal to the direct current operating potential source across the positive polarity output terminal and point of reference or ground potential 5.

The output signal of operating amplifier 35 is applied to the base electrode 71 of type NPN-transistor 70 through resistor 44. The collector electrode 72 of transistor 70 is connected through collector resistor 94 to the positive polarity output terminal of direct current potential source 9 and the emitter electrode 73 thereof is connected to the negative polarity output terminal of the direct current potential source 9. Therefore, this type NPN-transistor is properly poled for forward collector-emitter conduction. With a negative polarity signal upon the output circuit terminal 38 of operational amplifier 35, transistor 70 is not conductive and the potential upon junction 95 is of a positive polarity. With a positive polarity signal present upon the output circuit terminal 38 of operational amplifier 35, base-emitter current flows through type NPN-transistor 70 to initiate collector-emitter current flow therethrough, consequently, the potential upon junction 95 is of a negative polarity. The detailed operation of this circuit to extinguish field effect transistor 60 when operational amplifier 15 has integrated the signal produced by direct current potential signal source 20 to substantially zero will be described in detail later in this specification.

To assure that the output signal of integrating operational amplifier 15 returns to zero at the conclusion of each reference signal cycle, a reset circuit is provided by field effect transistor 65 of the N-channel type having a source electrode 66, a drain electrode 67 and a gate electrode 68. The source-drain electrodes of field effect transistor 65 are connected across the output circuit terminal 18 and the inverting input circuit terminal 16 of integrating operational amplifier 15.

For purposes of this specification it will be assumed that the direct current potential signal produced by direct current potential signal source 10, hereinafter referred to as the dividend signal, is of a negative polarity with respect to point of reference or ground potential 5, that the direct current potential signal produced by direct current potential source 20, hereinafter referred to as the divisor signal, is of a positive polarity with respect to point of reference or ground potential 5 and that the direct current potential signal produced by direct current potential source 30, hereinafter referred to as the multiplier signal, is of a negative polarity with respect to point of reference or ground potential 5.

Direct current potential signal source 10 is connected through the source-drain electrodes of N-channel type field effect transistor 40 to a selected one input circuit terminal of operational amplifier 15 whereby the dividend signal is integrated thereby in a first polarity direction. The negative polarity output terminal of direct current potential signal source 10 is connected to the inverting input circuit terminal 16 of integrating operational amplifier 15 through the source-drain electrodes of N-channel type field effect transistor 40 and input resistor 45, consequently, integrating amplifier 15 integrates the dividend signal in a positive polarity direction.

Direct current potential signal source 20 is connected through the source drain electrodes of field effect transistor 50 to the one input circuit terminal of integrating operational amplifier 15 which results in the integration thereby of the second direct current potential signal in a second opposite polarity direction. Therefore, the positive polarity output terminal of direct current potential signal source 20 is connected to the integrating input circuit terminal 16 of integrating operational amplifier 15 through input resistor 54. Consequently, operational amplifier 15 integrates the positive polarity divisor signal in the negative polarity direction.

Direct current potential signal source 30 is connected through the source-drain electrodes of N-channel type field effect transistor 60 to the input circuit of the averaging circuit. Consequently, the negative polarity terminal of direct current potential signal source 30 is connected to the inverting input circuit terminal 26 of operational amplifier 25 through the source drain electrodes of N-channel type field effect transistor 60 through input resistor 12.

One of the alternating current reference signal source output circuits is connected to the gate electrode of the field effect transistor through which the dividend signal is applied to the integrating operational amplifier and the other one of the alternating current reference signal source output circuits is connected to the gate electrodes of the field effect transistors through which the divisor signal is applied to the integrating operational amplifier 15 and through which the multiplier signal is applied to the averaging operational amplifier 25 and to the gate electrode of the reset field effect transistor.

Output terminal 98 of the square waveform alternating current reference signal source 6 is connected to the gate electrode 43 of field effect transistor 40 through diode 46 and output circuit terminal 99 of the square waveform alternating current reference signal source is connected to the gate electrodes 63, 53 and 68 of each of respective field effect transistors 60, 50 and 65 through respective diodes 55, 56, and 57.

Over those half cycles of the alternating current reference signals during which output terminals 98 and 99 of reference signal source 6 are of a positive and a negative polarity, respectively, with respect to point of reference or ground potential 5, the positive polarity signal upon output terminal 98 permits field effect transistor 40 to conduct, and the negative polarity signal upon output terminal 99 applied to the gate electrodes 63, 53 and 68 of respective field effect transistors 60, 50 and 65 holds these devices not conductive. While field effect transistor 40 conducts, the dividend input signal appears across load resistor 47, curve B of FIG. 3. The negative polarity dividend signal, therefore, is applied to the inverting input circuit terminal 16 of operational amplifier 15 which integrates this negative polarity dividend signal in a positive direction for the duration of these half cycles of the reference signals as shown in curve D of FIG. 3. As the output signal upon output circuit terminal 18 of integrating operational amplifier 15 is of a positive polarity, the output signal upon output circuit terminal 38 of operational amplifier 35 is of a negative polarity. With a negative polarity signal present upon the output circuit of operational amplifier 35, transistor 70 is not conductive. Consequently, the potential upon junction 95 is of a positive polarity. This signal is of no effect at this time as the negative polarity reference signal maintains field effect transistor 60 not conductive.

Over the alternate half cycles of the alternating current reference signals during which output terminals 98 and 99 of reference signal source 6 are of a negative and a positive polarity, respectively, with respect to point of reference or ground potential 5, the negative polarity output signal upon output terminal 98 extinguishes field effect transistor 40 to remove the dividend signal from integrating operational amplifier 15 and the positive polarity signal upon output terminal 99 permits field effect transistors 50 and 60 to conduct. Although this signal is also applied to the gate electrode 68 of reset field effect transistor 65, this device is maintained not conductive by the negative polarity signal present upon output circuit terminal 38 of operational amplifier 35 which is applied to the gate electrode 68 thereof through diode 69. While field effect transistors 50 and 60 conduct, the positive polarity divisor signal appears across load resistor 58, curve C of FIG. 3, and simultaneously, the negative polarity multiplier signal appear across load resistor 59, curve E of FIG. 3. The positive polarity divisor signal, therefore, is applied to the inverting input circuit terminal 16 of integrating operational amplifier 15 which integrates this positive polarity divisor signal in a negative polarity direction as shown in curve D of FIG. 3.

When integrating operational amplifier 15 has integrated the divisor signal to substantially zero, operational amplifier 35 switches to its alternate state in which the output signal is of a positive polarity. This positive polarity signal produces base-emitter current flow through type NPN-transistor 70 to initiate collector-emitter current flow therethrough. Upon the conduction of transistor 70 through the collector-emitter electrodes, the potential upon junction 95 goes negative and is applied to the gate electrode 63 of field effect transistor 60 through diode 48 to extinguish field effect transistor 60 which disconnects the direct current multiplier signal source 30 from the averaging circuit. Simultaneously, the positive polarity signal upon output circuit terminal 38 of operational amplifier 35 permits source-drain current flow through reset field effect transistor 65, a condition which resets the output signal upon output circuit terminal 18 of operational amplifier 15 to zero.

The magnitude of the dividend signal determines the magnitude of the integrated dividend signal and the magnitude of the divisor signal determines the length of time required for integrating operational amplifier 15 to the integrate the divisor signal in the opposite direction to substantially zero. Consequently, the length of time required for integrating operational amplifier 15 to integrate the divisor signal to substantially zero is a function of the ratio of the relative magnitudes of the divisor signal and the dividend signal and is an analog representation of the quotient of the dividend signal divided by the divisor signal. For example, as the dividend signal is integrated in a first direction by integrating operational amplifier 15 for the duration of a complete half cycle of the reference signals, the length of time required for integrating operational amplifier 15 to integrate a divisor signal of a magnitude precisely equal to the magnitude of the dividend signal to substantially zero is equal to the period of a complete half cycle of the reference signals, or unity, and to integrate a divisor signal of a magnitude precisely equal to twice the magnitude of the dividend signal to substantially zero is equal to the period of one-fourth cycle of the reference signals, or 0.5. As the multiplier signal appears across load resistor 59 for the period of time required for integrating operational amplifier 15 to integrate the divisor signal to substantially zero, the width of the multiplier signal pulse across load resistor 59 is also an analog representation of the quotient of the dividend signal divided by the divisor signal. Consequently, the multiplier signal appears across load resistor 59 as a series of direct current pulses of a magnitude equal to the magnitude of the multiplier signal and for a duration of time which is the analog representation of the quotient of the dividend signal divided by the divisor signal. These direct current pulses are averaged by operational amplifier 25 and appear as a direct current potential signal across output terminals 100 and 101 which represents, in analog form, the product of the multiplier signal and the quotient of the dividend signal divided by the divisor signal.

Although the foregoing description was on the basis of integrating the dividend signal in a positive polarity direction and the divisor signal in a negative polarity direction, it is to be specifically understood that the dividend signal may be integrated in a negative polarity direction and the divisor signal in a positive polarity direction, the only requirement being that they are integrated in opposite directions.

The foregoing description was also on the basis of a negative polarity dividend signal and a positive polarity divisor signal. A positive polarity dividend signal and a negative polarity divisor signal would be applied to the noninverting circuit terminal of integrating operational amplifier 15. Depending upon the desired polarity of the output signal, the multiplier signal may be of either polarity and applied to the input circuit terminal of averaging operational amplifier 25 which would provide the preselected polarity output signal.

While specific electrical devices, field effect transistor types and electrical polarities have been set forth in this specification, it is to be specifically understood that alternate electrical devices, field effect transistors and compatible electrical polarities which provide the same results may be substituted therefor without departing from the spirit of the invention.

While a preferred embodiment of the present invention has been shown and described, it will be obvious to those skilled in the art that various modifications and substitutions may be made without departing from the spirit of the invention which is to be limited only within the scope of the appended claims.

What is claimed is:

1. A divider-multiplier circuit for dividing a first direct current potential signal by a second direct current potential signal and multiplying the quotient by a third direct current potential signal comprising: a source of square waveform alternating current reference signals, an operational amplifier having an inverting input circuit, a noninverting input circuit, an output circuit and feedback circuitry which renders this device capable of integrating direct current input signals in a positive and a negative direction, an averaging circuit having an input circuit and an output circuit upon which the divider-multiplier output signal appears of the type which will provide a direct current potential output signal of a magnitude which is the average of the magnitudes of a series of direct current potential input signal pulses, first switch means responsive to each selected half cycle of said reference signals for applying said first direct current potential signal to a selected one said input circuit of said operational amplifier whereby said first direct current potential signal is integrated thereby in a first polarity direction, second and third switch means responsive to each alternate half cycle of said reference signals for applying said second direct current potential signal to the one said input circuit of said operational amplifier which results in the integration thereby of said second direct current potential signal in a second opposite polarity direction and for applying said third direct current potential signal to said input circuit of said averaging circuit, respectively, and means responsive to an output signal of substantially zero from said operational amplifier for rendering said third switch means not conductive.

2. A divider-multiplier circuit for dividing a first direct current potential signal by a second direct current potential signal and multiplying the quotient by a third direct current potential signal comprising: a source of square waveform alternating current reference signals having two complementary polarity output circuits, an operational amplifier having an inverting input circuit, a noninverting input circuit, an output circuit and feedback circuitry which renders this device capable of integrating direct current input signals in a positive and a negative direction, an averaging circuit having an input circuit and an output circuit upon which the divider-multiplier output signal appears of the type which will provide a direct current potential output signal of a magnitude which is the average of the magnitudes of a series of direct current potential input signal pulses, first switch means responsive to said reference signals of a selected one polarity while present upon one of said reference signal source output circuits for applying said first direct current potential signal to a selected one said input circuit of said operational amplifier whereby said first direct current potential signal is integrated thereby in a first polarity direction, second and third switch means responsive to said reference signals of the same polarity while present upon the other one of said reference signal source output circuits for applying said second direct current potential signal to the one said input circuit of said operational amplifier which results in the integration thereby of said second direct current potential signal in a second opposite polarity direction and for applying said third direct current potential signal to said input circuit of said averaging circuit, respectively, and means responsive to an output signal of substantially zero from said operational amplifier for rendering said third switch means not conductive.

3. A divider-multiplier circuit for dividing a first direct current potential signal by a second direct current potential signal and multiplying the quotient by a third direct current potential signal comprising: a source of square waveform alternating current reference signals having two complementary polarity output circuits, an operational amplifier having an inverting input circuit, a noninverting input circuit, an output circuit and feedback circuitry which renders this device capable of integrating direct current input signals in a positive and a negative direction, an averaging circuit having an input circuit and an output circuit upon which the divider-multiplier output signal appears of the type which will provide a direct current potential output signal of a magnitude which is the average of the magnitudes of a series of direct current potential input signal pulses, a first field effect transistor responsive to said reference signals of a selected one polarity while present upon one of said reference signal source output circuits for applying said first direct current potential signal to a selected one said input circuit of said operational amplifier whereby said first direct current potential signal is integrated thereby in a first polarity direction, second and third field effect transistors responsive to said reference signals of the same polarity while present upon the other one of said reference signal source output circuits for applying said second direct current potential signal to the one said input circuit of said operational amplifier which results in the integration thereby of said second direct current potential signal in a second opposite polarity direction and for applying said third direct current potential signal to said input circuit of said averaging circuit, respectively, and means responsive to an output signal of substantially zero from said operational amplifier for extinguishing said third field effect transistor.

4. A divider-multiplier circuit for dividing a first direct current potential signal by a second direct current potential signal and multiplying the quotient by a third direct current potential signal comprising in combination with first, second and third direct current potential signal sources, a source of square waveform alternating current reference signals having two complementary polarity output circuits, an operational amplifier having an inverting input circuit, a noninverting input circuit, an output circuit and feedback circuitry which renders this device capable of integrating direct current input signals in a positive and a negative direction, an averaging circuit having an input circuit and an output circuit upon which the divider-multiplier output signal appears of the type which will provide a direct current potential output signal of a magnitude which is the average of the magnitudes of a series of direct current potential input signal pulses, first, second and third field effect transistors each having source, drain and gate electrodes, means for connecting said first direct current potential signal source through said source-drain electrodes of said first field effect transistor to a selected one said input circuit of said operational amplifier whereby said first direct current potential signal is integrated thereby in a first polarity direction, means for connecting said second direct current potential signal source through said source-drain electrodes of said second field effect transistor to the one said input circuit of said operational amplifier which results in the integration thereby of said second direct current potential signal in a second opposite polarity direction, means for connecting said third direct current potential signal source through said source-drain electrodes of said third field effect transistor to said input circuit of said averaging circuit, means for connecting a selected one of said alternating current reference signal source output circuits to said gate electrode of said first field effect transistor, means for connecting the other one of said alternating current reference signal source output circuits to the said gate electrode of each said second and third field effect transistors, and circuitry responsive to an output signal of substantially zero upon said output circuit of said operational amplifier for extinguishing said third field effect transistor when said operational amplifier has integrated said second direct current potential signal to substantially zero.

5. A divider-multiplier circuit for dividing a first direct current potential signal by a second direct current potential signal and multiplying the quotient by a third direct current potential signal comprising in combination with first, second and third direct current potential signal sources, a source of square waveform alternating current reference signals having two complementary polarity output circuits, an operational amplifier having an inverting input circuit, a noninverting input circuit, an output circuit and feedback circuitry which renders this device capable of integrating direct current input signals in a positive and a negative direction, an averaging circuit having an input circuit and an output circuit upon which the divider-multiplier output signal appears of the type which will provide a direct current potential output signal of a magnitude which is the average of the magnitudes of a series of direct current potential input signal pulses, first, second, third and fourth field effect transistors each having source, drain and gate electrodes, means for connecting said first direct current potential signal source through said source-drain electrodes of said first field effect transistor to a selected one said input circuit of said operational amplifier whereby said first direct current potential signal is integrated thereby in a first polarity direction, means for connecting said second direct current potential signal source through said source-drain electrodes of said second field effect transistor to the one said input circuit of said operational amplifier which results in the integration thereby of said second direct current potential signal in a second opposite polarity direction, means for connecting said third direct current potential signal source through said source-drain electrodes of said third field effect transistor to said input circuit of said averaging circuit, means for connecting said source-drain electrodes of said fourth field effect transistor across said output circuit and said inverting input circuit of said operational amplifier, means for connecting a selected one of said alternating current reference signal source output circuits to said gate electrode of said first field effect transistor, means for connecting the other one of said alternating current reference signal source output circuits to the said gate electrode of each said second, third, and fourth field effect transistors, circuitry responsive to an output signal of substantially zero upon said output circuit of said operational amplifier for producing an electrical signal when said operational amplifier has integrated said second direct current potential signal to substantially zero, and means for applying said electrical signal to said gate electrode of said third field effect transistor in a polarity relationship which will extinguish this device.

6. A divider-multiplier circuit for dividing a first direct current potential signal by a second direct current potential signal and multiplying the quotient by a third direct current potential signal comprising in combination with first, second and third sources of direct current potential signals, a source of square waveform alternating current reference signal source having two complementary polarity output circuits, a first operational amplifier having an inverting input circuit, a noninverting input circuit, an output circuit and feedback circuitry which renders this device capable of integrating direct current input signals in a positive and a negative direction, a second operational amplifier having an inverting input circuit and a noninverting input circuit, an output circuit upon which the divider-multiplier output signal appears and feedback circuitry which renders this device capable of producing a direct current potential output signal of a magnitude which is the average of the magnitudes of a series of direct current potential input signal pulses, first, second and third field effect transistors each having source, drain and gate electrodes, means for connecting said first direct current potential signal source through said source-drain electrodes of said first field effect transistor to a selected one said input circuit of said first operational amplifier whereby said first direct current potential signal is integrated thereby in a first polarity direction, means for connecting said second direct current potential signal source through said source-drain electrodes of said second field effect transistor to the one said input circuit of said first operational amplifier which results in the integration thereby of said second direct current potential signal in a second opposite polarity direction, means for connecting said third direct current potential signal source through said source-drain electrodes of said third field effect transistor to said inverting input circuit of said second operational amplifier, means for connecting a selected one of said alternating current reference signal source output circuits to said gate electrode of said first field effect transistor, means for connecting the other one of said alternating current reference signal source output circuits to the said gate electrodes of each said second and third field effect transistors, and circuitry responsive to an output signal of substantially zero upon said output circuit of said first operational amplifier for extinguishing said third field effect transistor when said first operational amplifier has integrated said second direct current potential signal to substantially zero.

* * * * *